UNITED STATES PATENT OFFICE.

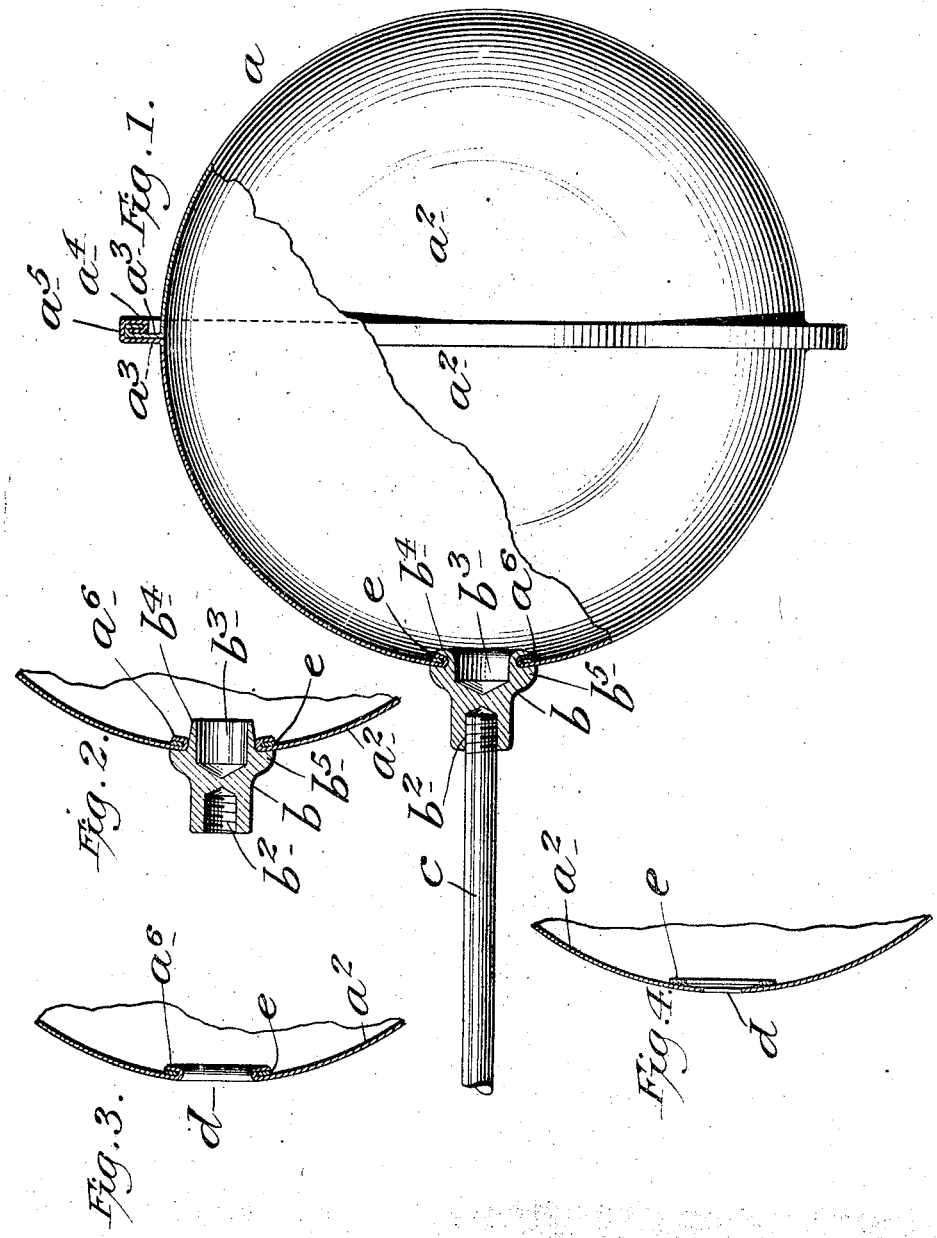

WILLIAM BRIGGS, OF BROOKLYN, NEW YORK.

VALVE-OPERATING FLOAT.

944,477.

Specification of Letters Patent.   Patented Dec. 28, 1909.

Application filed April 20, 1908. Serial No. 428,265.

*To all whom it may concern:*

Be it known that I, WILLIAM BRIGGS, a citizen of the United States, and residing at Brooklyn, in the county of Kings and State of New York, have invented certain new and useful Improvements in Valve-Operating Floats, of which the following is a specification, such as will enable those skilled in the art to which it appertains to make and use the same.

This invention relates to valve operating floats, such as are usually employed in the flush tanks of water-closets, and the object thereof is to provide a valve operating float of this class which is composed of sheet metal which will not corrode, rust or be injuriously affected by water, acids or the like, and the separate parts of which are made in such manner as to form a perfectly air-tight and water-tight joint without the use of solder or similar material, and the said invention relates particularly to the construction of the float and the method of connecting the valve operating rod therewith.

The invention is fully disclosed in the following specification, of which the accompanying drawing forms a part, in which the separate parts of my improvement are designated by suitable reference characters in each of the views, and in which:—

Figure 1 is a sectional side view showing my improved valve operating float, and showing the method of connecting the valve operating rod therewith, Fig. 2 a view similar to Fig. 1 but showing only a part of the float and showing the spud or coupling device which connects the valve rod with the float, and showing one step in the operation of connecting said valve rod with the float, and;—Figs. 3 and 4 views similar to Fig. 2 but omitting the spud or coupling device, and showing different steps in the process of connecting the valve rod with the float.

In the drawing forming part of this specification, I have shown at $a$ a hollow spherical valve float of the class specified, said float being composed of sheet metal which will not corrode, rust or be injuriously affected by water or acids, copper being preferably employed.

The float $a$, as shown, is composed of two semi-spherical parts $a^2$, each of which is provided at its perimeter with a flange or rim $a^3$. The flange or rim $a^3$ on one part of the float is wider than the other, and in practice the separate parts of the float are placed together and the edge of the wider flange or rim $a^3$ is folded around and compressed on the edge of the narrower flange or rim $a^3$, after which the outer part $a^4$ of the flanges or rims $a^3$ is folded over into the position shown at $a^5$ in Fig. 1, and this method of connecting the separate parts $a^2$ of the float forms a joint which is both air-tight and water-tight, and the flanges $a^3$ in the process of folding the same as above described being also firmly pressed together. I also provide a spud or coupling device $b$ by means of which the valve operating rod $c$ is connected with the float, and the coupling device $b$ is also composed of metal which will not corrode or rust or be injuriously affected by water or acids, and said coupling device is provided at one end with a screw threaded socket $b^2$ adapted to receive the rod $c$, and in the opposite end with a socket, recess or chamber $b^3$ forming a thin projecting flange or rim $b^4$ around the base of which is an annular collar or flange $b^5$. One part of the float is provided centrally thereof with an opening $d$ through which, in connecting the coupling device $b$ with the float, the part $b^4$ of the coupling device is passed, and placed around said opening and on the inner side of the part $a^2$ of the float in which said opening is formed is an annular washer $e$, the diameter of which is greater than the diameter of said opening, and said washer is also composed of metal which will not corrode, rust or be injuriously affected by water, acids and the like, and in practice, the edge portion of the float member around said opening is folded inwardly and around the washer $e$ as clearly shown at $a^6$ in Figs. 1, 2 and 3 after which the flange or rim forming the part $b^4$ of the spud or coupling device $b$ is expanded or sprung out over the parts $e$ and $a^6$ and firmly compressed thereon as clearly shown in Fig. 1, and this operation securely binds the float, the coupling device $b$ and the annular washer $e$ together and forms a perfectly air-tight and water-tight connection.

It will be understood that the washer $e$ may be connected with the part $a^2$ of the float as shown in Fig. 1 before the operation of connecting the coupling device $b$ therewith, and it will also be understood that in both of these operations the separate parts are put under great pressure so as to press them firmly together, and this operation forms a reinforced, stiffened and smooth rounded connection or coupling between the float and the device for connecting the float with the rod $c$ and when the parts are connected in this manner the float cannot be detached from the coupling device $b$ without destroying the float, or that part thereof with which said coupling device is connected.

It will also be understood that the coupling device $b$ is connected with one part $a^2$ of the float before the separate parts of the float are connected. In practice the rod $c$ is connected with the valve which controls the flow of water into the flush tank in the ordinary manner, and the rise and fall of the float in the tank occasioned by the rise and fall of the water therein operates the valve in the usual manner, but said valve and tank form no part of this invention and are therefore not shown and described.

Although I have shown and described my improved valve float as particularly designed for use in flush tanks of water-closets, it will be apparent that a valve float made in this manner may be used in other relations, or in connection with valves and water tanks designed for other purposes.

Having fully described my invention, what I claim as new and desire to secure by Letters Patent, is:—

A float of the class described, said float being composed of two parts, one of which is provided in one side thereof with an aperture, and a rod connecting device having an annular flange or rim adapted to be passed inwardly through said aperture, said rod connecting device being provided with an annular flange or rim adapted to bear on the outer side of the float, and an annular washer placed on the inner side of the float and inclosing said aperture and of greater diameter than said aperture and over and around which the material of the float around said aperture is folded to form a flange which overlaps said washer on the inner side of the float, and the flange or rim of the connecting device which is passed inwardly through said aperture being expanded and folded over and compressed on said annular washer and over the flange or rim of the float which incloses said washer on the inner side, so as to form a reinforced, smooth and rounded connection or joint between the float and the rod connecting device.

In testimony that I claim the foregoing as my invention I have signed my name in presence of the subscribing witnesses this 18th day of April 1908.

WILLIAM BRIGGS.

Witnesses:
  C. E. MULREANY,
  M. E. DOODY.